No. 741,211. PATENTED OCT. 13, 1903.
M. ABRAHAMOVITZ.
SLEIGH ATTACHMENT FOR AUTOMOBILES.
APPLICATION FILED JAN. 21, 1903.
NO MODEL.
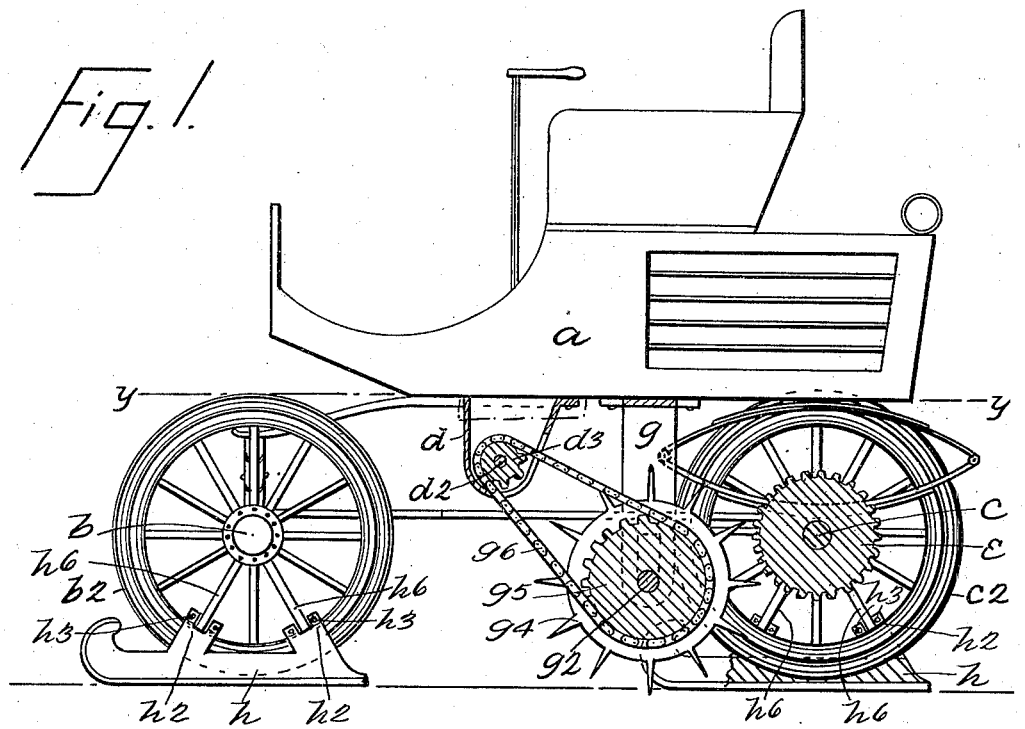
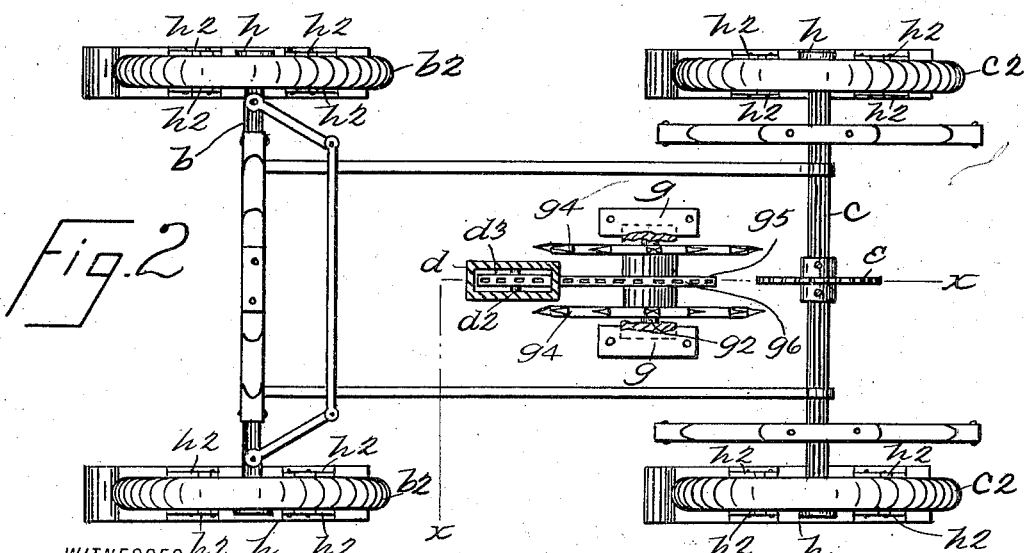

No. 741,211.

Patented October 13, 1903.

UNITED STATES PATENT OFFICE.

MAX ABRAHAMOVITZ, OF YONKERS, NEW YORK.

SLEIGH ATTACHMENT FOR AUTOMOBILES.

SPECIFICATION forming part of Letters Patent No. 741,211, dated October 13, 1903.

Application filed January 21, 1903. Serial No. 139,898. (No model.)

*To all whom it may concern:*

Be it known that I, MAX ABRAHAMOVITZ, a citizen of the United States, residing at Yonkers, in the county of Westchester and State of New York, have invented certain new and useful Improvements in Means for Converting an Automobile into a Sleigh, of which the following is a specification, such as will enable those skilled in the art to which it appertains to make and use the same.

The object of this invention is to provide an improved means for converting an automobile into a sleigh, whereby this operation may be clearly and easily performed whenever desirable and whereby the means for converting an automobile into a sleigh may be detached and the vehicle used in the ordinary manner whenever necessary.

The invention is fully disclosed in the following specification, of which the accompanying drawings form a part, in which the separate parts of my improvement are designated by suitable reference characters in each of the views, and in which—

Figure 1 is a sectional side elevation of an automobile provided with my improvement, the section being on the line $xx$ of Fig. 2; and Fig. 2, a sectional plan view taken on the line $yy$ of Fig. 1, part of the construction being broken away or removed.

In the drawings forming part of this specification I have shown an ordinary automobile provided with the usual body portion $a$, the front axle $b$, the front wheels $b^2$, the rear axle $c$, and the rear wheels $c^2$, and the running-gear or framework thereof and the connection of the body portion $a$ therewith may be of the usual or any preferred construction.

Beneath the central part of the body portion $a$ is a casing $d$, through which is passed the usual power-shaft $d^2$, and this power-shaft is in practice geared in connection with a motor in the usual manner, said motor being not shown. The rear axle $c$ is also provided with a gear-wheel $e$ in the usual manner and the shaft $d^2$ with a corresponding gear-wheel $d^3$ in the usual manner, and when the vehicle is run as an ordinary automobile the wheels $d^3$ and $e$ are geared in connection by the usual drive-chain. With my improvement, however, I suspend beneath the rear part of the body portion $a$ hangers $g$, in which is mounted a shaft $g^2$, provided with two spur or teeth wheels $g^4$, the teeth or spurs of which project below the bottom of the wheels $b^2$ and $c^2$, and the shaft $g^2$ is also provided with a gear-wheel $g^5$, and when the vehicle is used as a sleigh this wheel is geared in connection with the wheel $d^3$ by a chain $g^6$. I also provide each of the wheels $b^2$ and $c^2$ with a shoe $h$, and these shoes are provided with upwardly and inwardly inclined jaws $h^2$, between which the rims of the wheels are passed and by means of which the shoes are secured to said wheels by means of bolts $h^3$, and the upper ends of the jaws $h^2$ are so arranged that the bolts $h^3$ will be on opposite sides of two of the spokes $h^6$ of the wheels, as clearly shown, and by means of this construction the said shoes may be secured to said wheels whenever desirable and removed therefrom whenever necessary.

The shoes $h$ are elongated forwardly and backwardly, so as to provide an extending bearing-surface therefor and also to prevent the wheels of the vehicle from turning with said shoes; but this object may be accomplished by locking the wheels in any suitable manner, and my invention is not limited to any particular means for preventing the turning of the wheels of the vehicle when the shoes $h$ are connected therewith; but I prefer to accomplish this result by making said shoes long enough to prevent such turning.

It will be observed that the teeth or spurs of the wheels $g^4$ project to and below the bottoms of the shoes $h$ when the said shoes are secured to the wheels $b^2$ and $c^2$, and when the shaft $d^2$ is driven in the usual manner these wheels $g^4$ will be turned by means of the chain $g^6$ and the wheels $g^4$ thus serve to propel the vehicle in the manner of an ordinary sleigh when the shoes $h$ are connected with the wheels $b^2$ and $c^2$, as herein shown and described.

By means of this invention an ordinary automobile may be converted into a sleigh at any time and my improvement may, as will be understood, be applied to any form of a vehicle provided with a motor by which it is driven.

Having fully described my invention, what

I claim as new, and desire to secure by Letters Patent, is—

A motor-vehicle the wheels of which are provided with detachable shoes which serve as runners, one of the axles of the vehicle being also provided with a gear-wheel, said vehicle being also provided with a shaft which is suspended in front of the rear wheels thereof and which is provided with spur or teeth wheels adapted to operate on the ground, and means for gearing said shaft in connection with the power-shaft of the vehicle, substantially as shown and described.

In testimony that I claim the foregoing as my invention I have signed my name, in presence of the subscribing witnesses, this 20th day of January, 1903.

MAX ABRAHAMOVITZ.

Witnesses:
J. C. LARSEN,
T. A. STEWART.